No. 12,385. REISSUED AUG. 29, 1905.
E. BRULEY.
FENCE POST.
APPLICATION FILED JUNE 17, 1905.
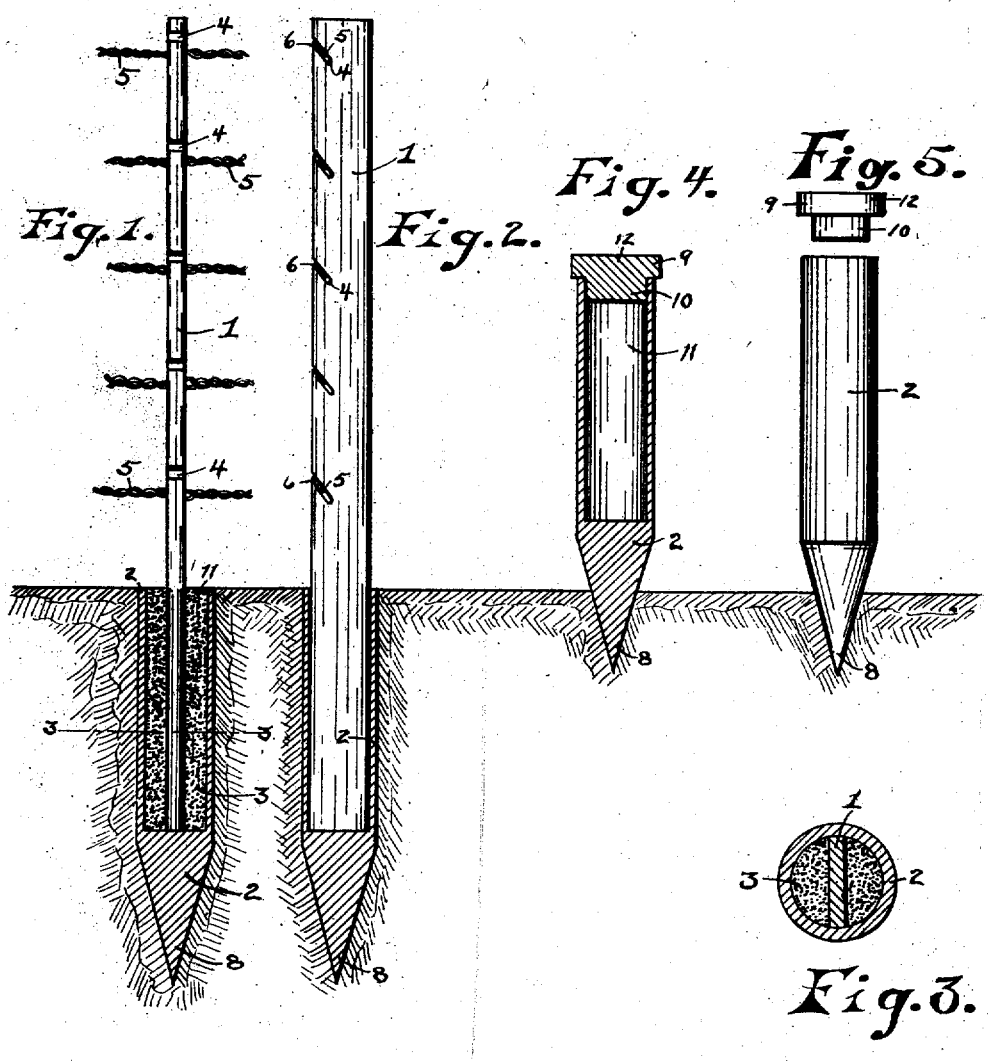
WITNESSES:
O. R. Ervin
N. Steinhart
INVENTOR.
Emery Bruley
BY Ervin & Wheeler
ATTORNEYS.

UNITED STATES PATENT OFFICE.

EMERY BRULEY, OF NEILLSVILLE, WISCONSIN, ASSIGNOR TO BRULEY STEEL FENCE-POST COMPANY, OF MILWAUKEE, WISCONSIN, A CORPORATION OF WISCONSIN.

FENCE-POST.

No. 12,385. Specification of Reissued Letters Patent. Reissued Aug. 29, 1905.

Original No. 775,518, dated November 22, 1904. Application for reissue filed June 17, 1905. Serial No. 265,824.

*To all whom it may concern:*

Be it known that I, EMERY BRULEY, a citizen of the United States, residing at Neillsville, in the county of Clark and State of Wisconsin, have invented certain new and useful Improvements in Fence-Posts; and I do declare the following to be a full, clear, and exact description of the invention, such as will enable others skilled in the art to which it appertains to make and use the same.

My invention relates to improvements in fence-posts having metallic bases.

The object of my invention is to improve and simplify the construction of devices of this character, and thereby render them more efficient and durable in use and less expensive to produce and erect.

With this and other objects in view the invention consists of certain novel features of construction, combination, and arrangement of parts, as will be more fully described, and particularly pointed out in the appended claim.

In the accompanying drawings, Figure 1 is a front or end elevation of my improved fence-post with its base in section. Fig. 2 is a side elevation of the same, the base being also in section. Fig. 3 is a horizontal section taken on the line 3 3 of Fig. 1. Fig. 4 is a vertical sectional view through the metallic base and its driving head or cap, showing the manner in which the base is inserted into the ground. Fig. 5 is an elevation of the base and its cap detached or separated.

Referring to the drawings by numerals, 1 denotes the post proper, 2 its metallic base, and 3 a filling of cement, lead, brimstone, or other suitable material, which secures said part 1 in said base. The part 1 is preferably, but not necessarily, of metal and, as shown, is in the form of a metallic bar, rectangular in cross-section and formed along one face with a vertical series of angularly-disposed kerfs or slots 4, in which the fence-wires 5 are inserted and retained by bending the lips 6, formed by said kerfs or slots, inwardly, so as to bind said fence-wires, as shown. The base 2 is a hollow cylindrical metallic body 7, formed with a tapered or pointed lower end 8 to adapt it to readily enter the ground. The base is driven into the ground by the blows from a sledge-hammer or other suitable device, and in order to protect the upper end of the base while this is being done I apply to said end a metal driving head or cap 9, which comprises a cylindrical shank 10, adapted to enter the bore 11 of the cylindrical body 7, and a circular head or disk 12 of slightly greater diameter than the outside diameter of the body 7. The blows of the hammer are struck upon this head 12 until the base is driven to a suitable depth in the ground, preferably so that the upper end of the portion 7 is flush with the level or surface of the ground, and the cap is then removed. The bar 1 is then inserted in the bore of the base, with the edges of said part in contact with the interior wall of said base, as shown in Fig. 3, and the filling 3, of cement or any other, desired material, is packed in said bore or socket portion of the base around the lower end of the part 1 to hold it solidly and rigidly in position.

From the foregoing description, taken in connection with the accompanying drawings, the construction and operation of the invention will be readily understood without requiring a more extended explanation.

Having thus described my invention, what I claim as new, and desire to secure by Letters Patent, is—

The herein-described fence-post, consisting of a base having a solid tapered point and a round hollow socket portion above the point, said base adapted to be driven into the ground; a bar inserted in said socket with edges in contact with the wall thereof, and a filling of cement between portions of the bar and the wall of the socket in the base.

In testimony whereof I have hereunto set my hand in the presence of two witnesses.

EMERY BRULEY.

Witnesses:

CARL STANGE,

JOSEPH MORLEY.